(12) United States Patent
Slabaugh et al.

(10) Patent No.: US 8,157,736 B2
(45) Date of Patent: Apr. 17, 2012

(54) SYSTEM AND METHOD FOR FEATURE DETECTION IN ULTRASOUND IMAGES

(75) Inventors: Gregory G. Slabaugh, Princeton, NJ (US); Gozde Unal, West Windsor, NJ (US); Ti-chiun Chang, West Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 1407 days.

(21) Appl. No.: 11/733,281

(22) Filed: Apr. 10, 2007

(65) Prior Publication Data

US 2007/0242864 A1    Oct. 18, 2007

Related U.S. Application Data

(60) Provisional application No. 60/745,042, filed on Apr. 18, 2006.

(51) Int. Cl.
*A61B 8/00* (2006.01)
*A61B 8/14* (2006.01)

(52) U.S. Cl. .......... 600/443; 600/437; 382/128; 382/131

(58) Field of Classification Search .................. None
See application file for complete search history.

(56) References Cited

U.S. PATENT DOCUMENTS

| | | | |
|---|---|---|---|
| 5,409,007 A | 4/1995 | Saunders et al. | |
| 5,653,235 A | 8/1997 | Teo | |
| 6,181,810 B1 | 1/2001 | Zhang et al. | |
| 6,200,267 B1 | 3/2001 | Burke | |
| 6,468,218 B1 | 10/2002 | Chen et al. | |
| 6,674,879 B1 | 1/2004 | Weisman et al. | |
| 6,984,211 B2 * | 1/2006 | Hao et al. | 600/443 |
| 2004/0054281 A1 * | 3/2004 | Adam et al. | 600/437 |

OTHER PUBLICATIONS

Bratsolis et al., Kullback-Leibler Divergence and Markov Random Fields for Speckled Image Restoration, IEEE, vol. 1, pp. 425-428, Jul. 2003.*
Cover, Thomas M. et al., "Elements of Information Theory," New York: John Wiley and Sons, (1991) p. 18.
Goodman. Joseph W., "Speckle Phenomena in Optics: Ttheory and Applications," Version 5.0, (2005) pp. 9-11.
Michailovich, O. et al., "Despeckling of Medical Ultrasound Images," IEEE Transactions on Ultrasonics, Ferroelectrics, and Frequency Control, vol. 53, No. 1 Jan. 2006.

* cited by examiner

*Primary Examiner* — Long V. Le
*Assistant Examiner* — Farshad Negarestan

(57) ABSTRACT

A system and method for feature detection in ultrasound images is disclosed. The method estimates speckle distributions in windows on opposing sides of a pixel of an ultrasound image. The divergence is calculated for the pixel between the estimated speckle distributions in the windows. These steps are performed for each pixel in the ultrasound image, and a feature map is generated based on the divergence calculated between the estimated speckle distributions for each pixel.

20 Claims, 10 Drawing Sheets

SYSTEM AND METHOD FOR FEATURE DETECTION IN ULTRASOUND IMAGES

This application claims the benefit of U.S. Provisional Application No. 60/745,042, filed Apr. 18, 2006, the disclosure of which is herein incorporated by reference.

BACKGROUND OF THE INVENTION

The present invention relates to detection of image features, and more particularly to feature detection in ultrasound images.

Ultrasound is a commonly used medical imaging modality. Compared to other medical imaging modalities, such as X-ray, magnetic resonance (MR), and positron emission tomography (PET), ultrasound has many advantages, as ultrasound is fast, portable, relatively low cost, and presents little risk to patients.

One limitation of ultrasound is image quality. Ultrasound images are often corrupted by speckle resulting from the coherent accumulation of random scattering in a resolution cell of the ultrasound beam. While the texture of the speckle does not correspond to any underlying structure, the local brightness of the speckle pattern is related to the local echogenicity of underlying scatterers. The speckle can have a detrimental effect on image quality and interpretability, and can cause inaccurate feature detection in ultrasound images.

Conventional approaches, such as the Canny edge detector, commonly detect features in images based on gradient operators. Often this is achieved by convolution of the image with a bandpass kernel K, which can be modeled as the derivative of a Gaussian function, $$K = \frac{\partial}{\partial x}\left(\frac{1}{\sqrt{2\pi}\,\sigma}e^{-x^2/(2\sigma^2)}\right)$$
$$= \frac{-x}{\sqrt{2\pi}\,\sigma^3}e^{-x^2/(2\sigma^2)}$$

where $\sigma^2$ is the variance. The gradient can then be defined as $G_x = K*I$, $G_y = K^T*I$, where I is the image and K is a 1D horizontal kernel. A feature map for identifying features in the image has a value equal to the gradient magnitude, $F = \sqrt{G_x^2 + G_y^2}$ for each pixel in the image However, since the gradient of an image is sensitive to the speckle, the speckle can adversely affect the feature map, leading to inaccurate feature detection. While increasing the variance may help to blur over the speckle, the effect of the speckle is often still apparent in feature maps generated using conventional methods. Furthermore, larger variances also blur edges in images, making actual image features of images more difficult to detect.

BRIEF SUMMARY OF THE INVENTION

The present invention provides a method and system for feature detection in ultrasound images which is less sensitive to speckle. Embodiments of the present invention provide an information-theoretic method which utilizes models of the speckle distribution in ultrasound images to estimate the speckle distribution in various regions of an ultrasound image. By comparing estimates of the speckle distribution in neighboring regions of an ultrasound image, it is possible to detect salient features embedded in speckle.

In one embodiment of the present invention, speckle distributions are estimated in first and second windows on opposing sides of a pixel of an ultrasound image. A divergence value is calculated for the pixel between the estimated speckle distributions in the first and second windows. These steps may be performed for each pixel in the ultrasound image, and a feature map may be generated based on the divergence calculated between the estimated speckle distributions for each pixel. It is also possible that the speckle distributions are estimated in third and fourth windows on opposing sides of each pixel in a different direction than the first and second pixels. A divergence value can be calculated for each pixel between the estimated speckle distributions in the third and fourth windows and combined with the divergence value calculated for each pixel between the estimated speckle distributions in the first and second windows.

These and other advantages of the invention will be apparent to those of ordinary skill in the art by reference to the following detailed description and the accompanying drawings.

DETAILED DESCRIPTION OF EXEMPLARY EMBODIMENTS

Figure 1:
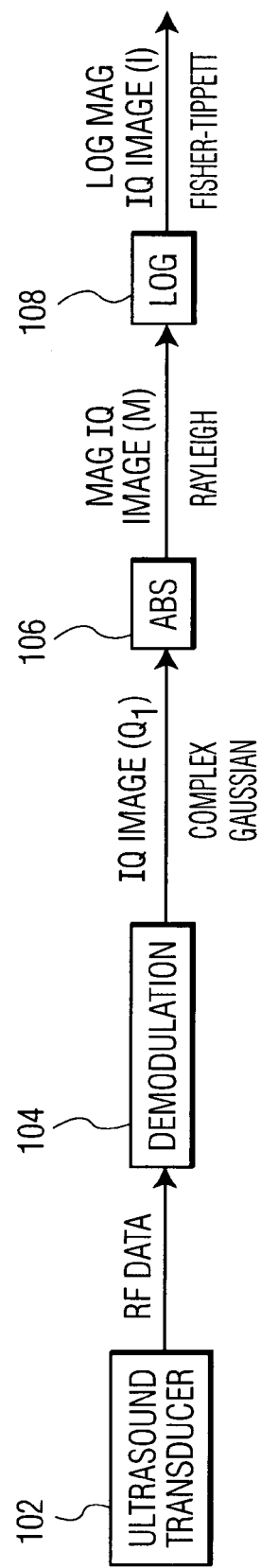
FIG. 1 is a block diagram illustrating ultrasound image formation.

The present invention is directed to a method for feature detection in ultrasound images using an information-theoretic approach based on speckle intensity distribution models derived from physical models of ultrasound image formation. FIG. 1 is a block diagram illustrating ultrasound image formation. An ultrasound transducer 102 transmits ultrasound waves into the body of a patient. The ultrasound waves are reflected by portions of the patient's body such as internal organs. The ultrasound transducer 102 measures the reflection of the ultrasound waves and generates RF data based on the reflection of the ultrasound waves. The RF data is then demodulated using a demodulation operator 104 to generate an in-phase/quadrature (IQ) image $Q_I(x,y)$. The speckle in an IQ image $Q_I(x,y)$ can be modeled as having a complex Gaussian distribution, $$p(Q_j(x, y)) = \frac{1}{2\pi\sigma^2}e^{-|Q_j(x,y)|^2/(2\sigma^2)}, \quad (1)$$

where $Q_I(x,y)$ is complex.

In order to produce a real image, envelope detection is performed by calculating the magnitude of the IQ image $Q_I(x,y)$ using an absolute value operator 106, thus generating a magnitude IQ image $M(x,y)$. The speckle in the magnitude IQ image $M(x,y)$ can be modeled as having a Rayleigh distribution, $$p(M(x, y)) = \frac{M(x, y)}{\sigma^2} e^{-M(x,y)^2/2\sigma^2}, \tag{2}$$

where $M(x,y)$ is real. The Rayleigh Distribution is described in detail in J. Goodman, *Speckle Phenomena in Optics: Theory and Applications Version 5.0*, 2005, which is incorporated herein by reference.

Since the magnitude IQ image $M(x,y)$ has a large dynamic range, the magnitude IQ image $M(x,y)$ can be logarithmically transformed using a log operator 108 to generate an image $I(x,y)$ (Log Mag IQ image) suitable for display. The speckle in the image $I(x,y)$ can be modeled as having a Fisher-Tippett (FT) distribution, $$p(I(x, y)) = 2e^{\frac{1}{2\sigma^2}} e^{\left(2I(x,y) - \ln(2\sigma^2) - e^{2I(x,y)}\ln(2\sigma^2)\right)}. \tag{3}$$

The FT distribution is described in detail in O. Michailovich and A. Tannenbaum, "Despeckling of Medical Ultrasound Images," IEEE *Transactions on Ultrasonics, Ferroelectrics, and Frequency Control*, vol. 53, no. 1, January 2006, which is incorporated herein by reference.

Given a region $\Omega$ in a Mag IQ image $M(x,y)$, it is possible to estimate the Rayleigh distribution in the region $\Omega$ based on the pixel intensities of pixels in the region $\Omega$. Since the speckle in $M(x,y)$ is modeled as having a Rayleigh distribution, the estimation of the Rayleigh distribution in the region $\Omega$ is an estimation of the speckle in the region $\Omega$. The maximum likelihood of the Rayleigh distribution in the region $\Omega$ can be estimated using the log likelihood of Equation (2). The log likelihood of Equation (2) can be expressed as $l(M(x,y), \sigma) = \int_\Omega \ln p(M(x,y)) dx dy$, such that:

$$l(M(x, y), \sigma) = \int_\Omega \left(\ln(M(x, y)) - \ln\sigma^2 - \frac{M(x, y)^2}{2\sigma^2}\right) dx dy. \tag{4}$$

In order to determine a maximum likelihood (ML) estimator for the Rayleigh distribution, $l(M(x,y),\sigma)$ can be differentiated with respect to $\sigma$, and set equal to zero to determine the ML estimate of $\sigma^2$, such that:

$$\sigma^2 = \frac{\int_\Omega M(x, y)^2 dx dy}{2\int_\Omega dx dy}. \tag{5}$$

Thus, given a region $\Omega$ in $M(x,y)$, the ML estimate of the parameter $\sigma^2$ can be calculated from the pixel intensities in the region $\Omega$ assuming a Rayleigh distribution, and used to estimate the speckle in the region $\Omega$.

Given a region $\Omega$ in a Log Mag IQ image $I(x,y)$, it is possible to estimate the FT distribution in the region $\Omega$ based on the pixel intensities of pixels in the region $\Omega$. Since the speckle in $I(x,y)$ is modeled as having an FT distribution, the estimation of the FT distribution in the region $\Omega$ is an estimation of the speckle in the region $\Omega$. An ML estimate for the FT distribution is derived similarly to the Rayleigh distribution described above. Accordingly, the parameter $\sigma^2$, which is the ML estimator for the FT distribution, can be determined based on the log likelihood of Equation (3), such that:

$$\sigma^2 = \frac{\int_\Omega (e^{2I(x,y)} - 1) dx dy}{2\int_\Omega dx dy}. \tag{6}$$

Thus, given a region $\Omega$ in $I(x,y)$, the ML estimate of the parameter $\sigma^2$ can be calculated from the pixel intensities in the region $\Omega$ assuming a FT distribution, and used to estimate the speckle in the region $\Omega$.

Given two distributions, p and q, estimated from two different regions of an image, it is possible to measure the divergence or "distance" between the distributions p and q. For example, Kullback-Liebler (KL) divergence, or relative entropy, is an information-theoretic measure between two distributions p and q. KL divergence is described in detail in T. Cover and J. Thomas, *Elements of Information Theory*, New York: John-Wiley and Sons, 1991, which is incorporated herein by reference. The relative entropy $D(p\|q)$ measures the inefficiency of assuming that a distribution is q when the true distribution is p. The KL divergence between two distributions p and q is defined as:

$$D(p\|q) = \int p(x) \ln \frac{p(x)}{q(x)} dx. \tag{7}$$

In the KL divergence defined in Equation (7), we assume that $$0 \ln \frac{0}{0} = 0$$

and $$p \ln \frac{p}{0} = 0.$$

The KL divergence between two distributions p and q is asymmetric, that is, $D(p\|q) \neq D(q\|p)$. However, the KL divergence can be symmetrized using the J-divergence, $$J = \frac{D(p\|q) + D(q\|p)}{2}.$$

The J-divergence can be thought of as a measure of "distance" between the probability distributions p and q.

For an image $M(x,y)$ (i.e., a Mag IQ image) that can be modeled locally with Rayleigh distributions, a distribution $p_M$ can be estimated in one window of pixels, and another distribution $q_M$ can be estimated in another window of pixels, such that:

$$p_M(M) = \frac{M(x,y)}{\sigma_1^2} e^{-M(x,y)^2/(2\sigma_1^2)} \qquad (8)$$

$$q_M(M) = \frac{M(x,y)}{\sigma_2^2} e^{-M(x,y)^2/(2\sigma_2^2)}, \qquad (9)$$

where $M(x,y)$ is the intensity at pixel $(x,y)$ in the magnitude IQ image and $\sigma_1^2$ and $\sigma_2^2$ are the parameters of the distributions $p_M$ and $q_M$, respectively.

The J-divergence can be computed between the distributions $p_M$ and $q_M$ as a measure of how "different" the regions are. The derivation of the expression for $D(p_M\|q_M)$ is shown below, and $D(q_M\|p_M)$ can be similarly derived to obtain the J-divergence. In the derivation below M is used to represent $M(x,y)$ for convenience. Based on Equations (7)-(9), $D(p_M\|q_M)$ can be expressed as:

$$D(p_M\|q_M) = \int_0^\infty \frac{M}{\sigma_1^2} e^{-M^2/(2\sigma_1^2)} \ln\left(\frac{\left(\frac{M}{\sigma_1^2} e^{-M^2/(2\sigma_1^2)}\right)}{\left(\frac{M}{\sigma_2^2} e^{-M^2/(2\sigma_2^2)}\right)}\right) dM. \qquad (10)$$

By expanding the ln term in Equation (10), performing the integration, and simplifying, Equation (10) can be re-written as:

$$D(p_M\|q_M) = \ln\left(\frac{\sigma_2^2}{\sigma_1^2}\right) - 1 + \frac{\sigma_1^2}{\sigma_2^2}. \qquad (11)$$

Therefore, the J-divergence can be expressed as:

$$J_M = -1 + \frac{\sigma_1^2}{2\sigma_2^2} + \frac{\sigma_2^2}{2\sigma_1^2}, \qquad (12)$$

where $\sigma_1^2$ and $\sigma_2^2$ are estimated parameters of the Rayleigh distributions determined from Equation (5).

For an image $I(x,y)$ (i.e., a Log Mag IQ image) that can be modeled locally with FT distributions, distributions $p_{FT}$ and $q_{FT}$ can be estimated in different windows of $I(x,y)$ as FT distributions having parameters $\sigma_1^2$ and $\sigma_2^2$ respectively. The J-divergence can be computed between the distributions $p_{FT}$ and $q_{FT}$ as a measure of how "different" the windows are. The derivation of the expression for $D(p_{FT}\|q_{FT})$ is shown below, and $D(q_{FT}\|p_{FT})$ can be similarly derived to obtain the J-divergence. In the derivation below, I is used to represent $I(x,y)$ for convenience. Based on Equations(3) and (7), $D(p_{FT}\|q_{FT})$ can be expressed as:

$$D(p_{FT}\|q_{FT}) = \int_0^\infty 2e^{\frac{1}{2\sigma_1^2}} e^{\left(2I-\ln(2\sigma_1^2)-e^{2I-\ln(2\sigma_1^2)}\right)} \qquad (13)$$

$$\ln\left(\frac{\left(2e^{\frac{1}{2\sigma_1^2}} e^{\left(2I-\ln(2\sigma_1^2)-e^{2I-\ln(2\sigma_1^2)}\right)}\right)}{\left(2e^{\frac{1}{2\sigma_2^2}} e^{\left(2I-\ln(2\sigma_2^2)-e^{2I-\ln(2\sigma_2^2)}\right)}\right)}\right) dI$$

By expanding the ln term in Equation (13), performing the integration, and simplifying, Equation (13) can be re-written as:

$$D(p_{FT}\|q_{FT}) = \ln\left(\frac{\sigma_2^2}{\sigma_1^2}\right) - 1 + \frac{\sigma_1^2}{\sigma_2^2}. \qquad (14)$$

Therefore, the J-divergence can be expressed as:

$$J_{FT} = -1 + \frac{\sigma_1^2}{2\sigma_2^2} + \frac{\sigma_2^2}{2\sigma_1^2}, \qquad (15)$$

where $\sigma_1^2$ and $\sigma_2^2$ are estimated parameters of the FT distributions determined from Equation (6).

Figure 2:
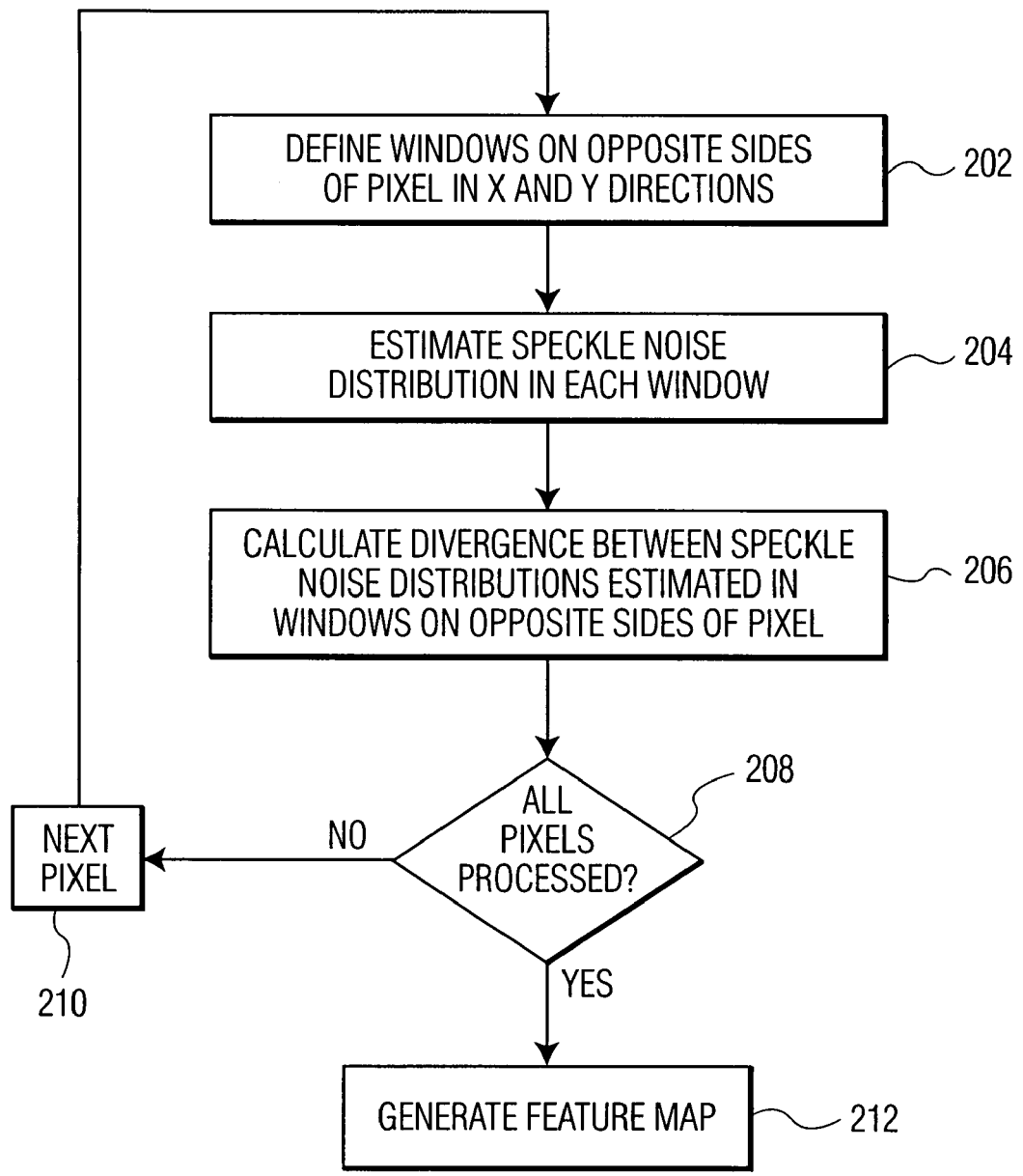
FIG. 2 is a flowchart illustrating a method of feature detection in an ultrasound image according to an embodiment of the present invention.

As described above, speckle in a region of an image can be estimated using a Rayleigh distribution or a FT distribution, and the divergence between distributions estimated in two regions can be calculated using the J-divergence. According to embodiments of the present invention, the above-described operations can be used for feature detection in ultrasound images. FIG. 2 is a flowchart illustrating a method of feature detection in an ultrasound image according to an embodiment of the present invention. According to various embodiments of the present invention, the ultrasound image may be a magnitude IQ image or a Log Mag IQ image.

Figure 3A:
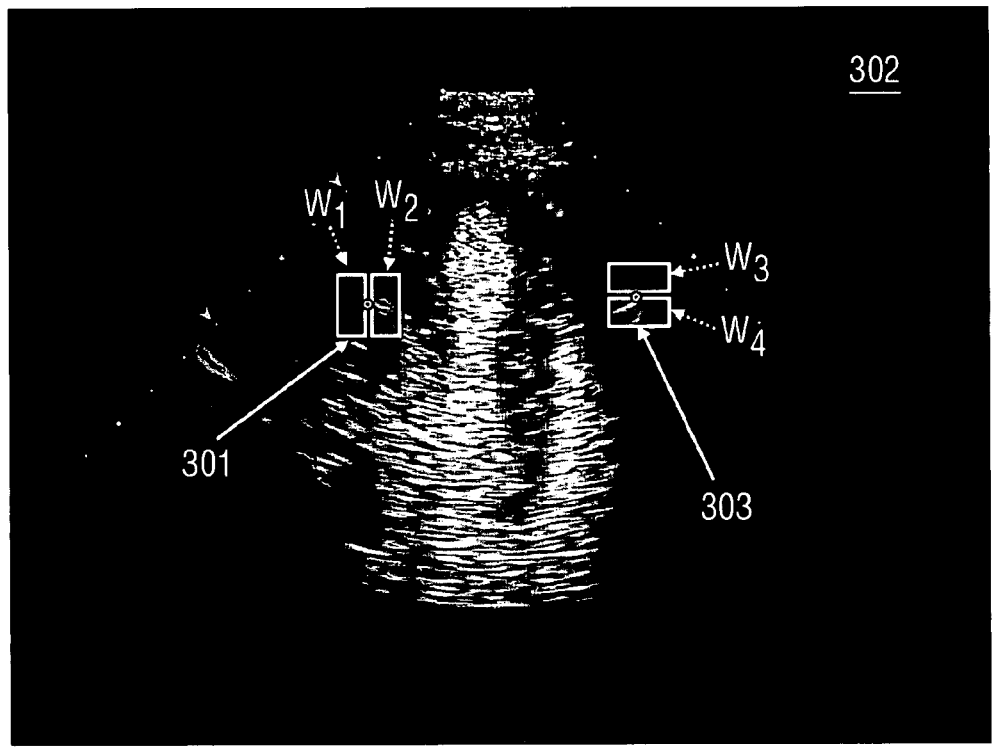
FIG. 3(a) illustrates an exemplary cardiac ultrasound image.

At step 202, for a pixel in the ultrasound image, adjacent windows to the pixel are defined. An adjacent window to a particular pixel is a region of the ultrasound image including at least one adjacent pixel to the particular pixel. According to a preferred embodiment of the present invention, adjacent windows to the pixel can be defined on opposing sides of the pixel in first and second directions (i.e., x and y directions). The first and second directions can be orthogonal with respect to each other, such that the pixel is surrounded by adjacent windows. The windows can have any shape or size, but it is preferable that windows on opposing sides of the pixel have the same shape and size. FIG. 3(a) illustrates an exemplary cardiac ultrasound image 302. As illustrated in FIG. 3(a), the windows $w_1$ and $w_2$ can be defined on opposing sides of a pixel in the horizontal (x) direction and the vertical (y) direction. FIG. 3(a) illustrates windows $w_1$ and $w_2$ on opposing sides of pixel 301 in the horizontal (x) direction and windows $w_3$ and $w_4$ on opposing sides of pixel 303 in the vertical (y) direction. According to a preferred embodiment of the present invention, a first set of windows $w_1$ and $w_2$ are defined on opposing sides of a pixel in the x direction and another set of windows $w_3$ and $w_4$ are defined in the y direction for the same pixel. It is also possible that the windows be defined in any other direction relative to the pixel.

Returning to FIG. 2, at step 204, the distribution of the speckle is estimated in each of the windows. For example, the speckle distribution in each window can be estimated as a Rayleigh distribution or an FT distribution, as described above. According to an embodiment of the present invention in which the ultrasound image is a magnitude IQ image $M(x,y)$, the speckle distribution is estimated in each window as a Rayleigh distribution by calculating the ML estimation of $\sigma^2$ for each window using Equation (5). According to an embodiment of the present invention in which the ultrasound image is a Log Mag IQ image $I(x,y)$, the speckle distribution is estimated in each window as an FT distribution by calculating the ML estimation of $\sigma^2$ for each window using Equation (6).

At step 206, the divergence is calculated between the speckle distributions estimated in windows on opposing sides of the pixel. The calculated divergence is a measure of how "different" the opposing windows are. For example, the J-divergence can be calculated between the speckle distributions estimated in windows on opposing sides of the pixel using Equation (12) or (15) for Rayleigh distributions or FT distributions, respectively. The J-divergence is calculated for each set of opposing windows. For example, when windows are defined on opposing sides of the pixel in the x and y directions, a J-divergence $J_x(x,y)$ is calculated between the speckle distributions estimated in the windows on opposing sides of the pixel in the x direction, and a J-divergence $J_y(x,y)$ is calculated between the speckle distributions estimated in the windows on opposing sides of the pixel in the y direction.

At step 208, it is determined whether all of a plurality of pixels in the ultrasound image have been processed. If any of the plurality of pixels have not been processed, the method proceeds to a next pixel at step 210, and loops back to step 202 for the next pixel. If it is determined that all of the plurality of pixels have been processed, the method proceeds to step 212.

At step 212, a feature map of the ultrasound images in generated. The feature map is generated by assigning each pixel in the ultrasound image an intensity value based on the divergence calculated for each pixel. For example, if $J_x(x,y)$ represents the J-divergence calculated for a pixel (x,y) in the x direction, and $J_y(x,y)$ represents the J-divergence calculated for a pixel (x,y) in the y direction, the feature map $F_J(x,y)$ can be defined as:

$$F_J(x,y)=\sqrt{J_x(x,y)^2+J_y(x,y)^2}. \qquad (16)$$

Accordingly, pixels in the ultrasound image at which a large divergence is detected between speckle distributions estimated surrounding the pixels will have higher intensity values in the feature map $F_J(x,y)$. Thus, the feature map $F_J(x,y)$ detects edges and features in the ultrasound image. The feature map $F_J(x,y)$ can be output to a display device in order to be displayed thereon.

Figure 3B:
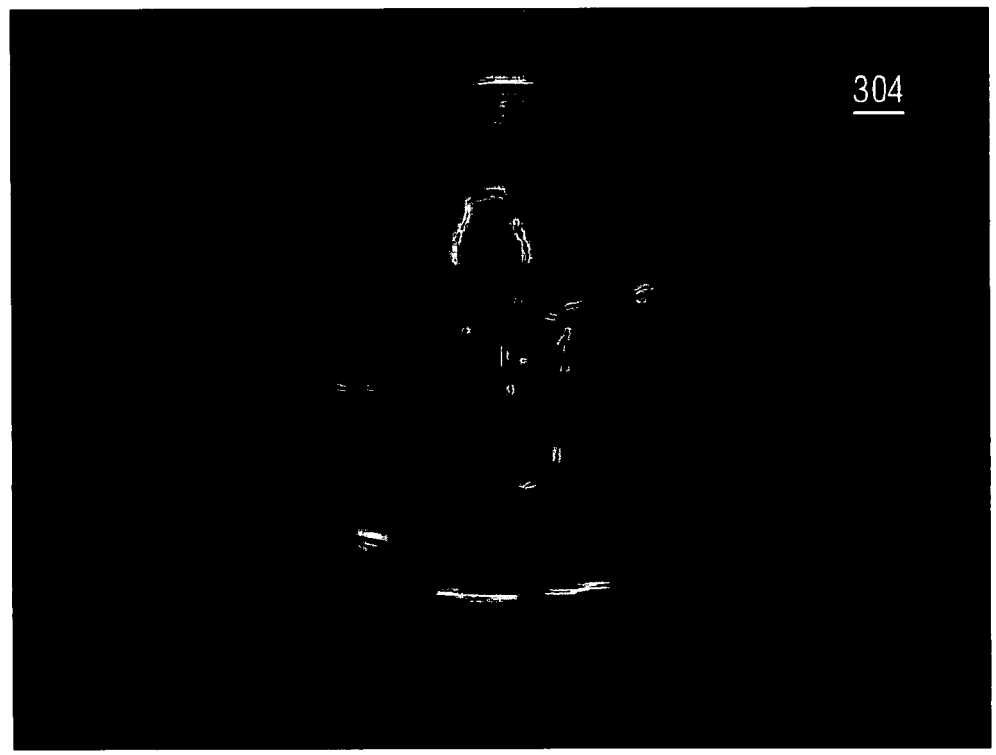
FIG. 3(b) illustrates a feature map of the cardiac ultrasound image of FIG. 3(a) according to an embodiment of the present invention.
Figure 3C:
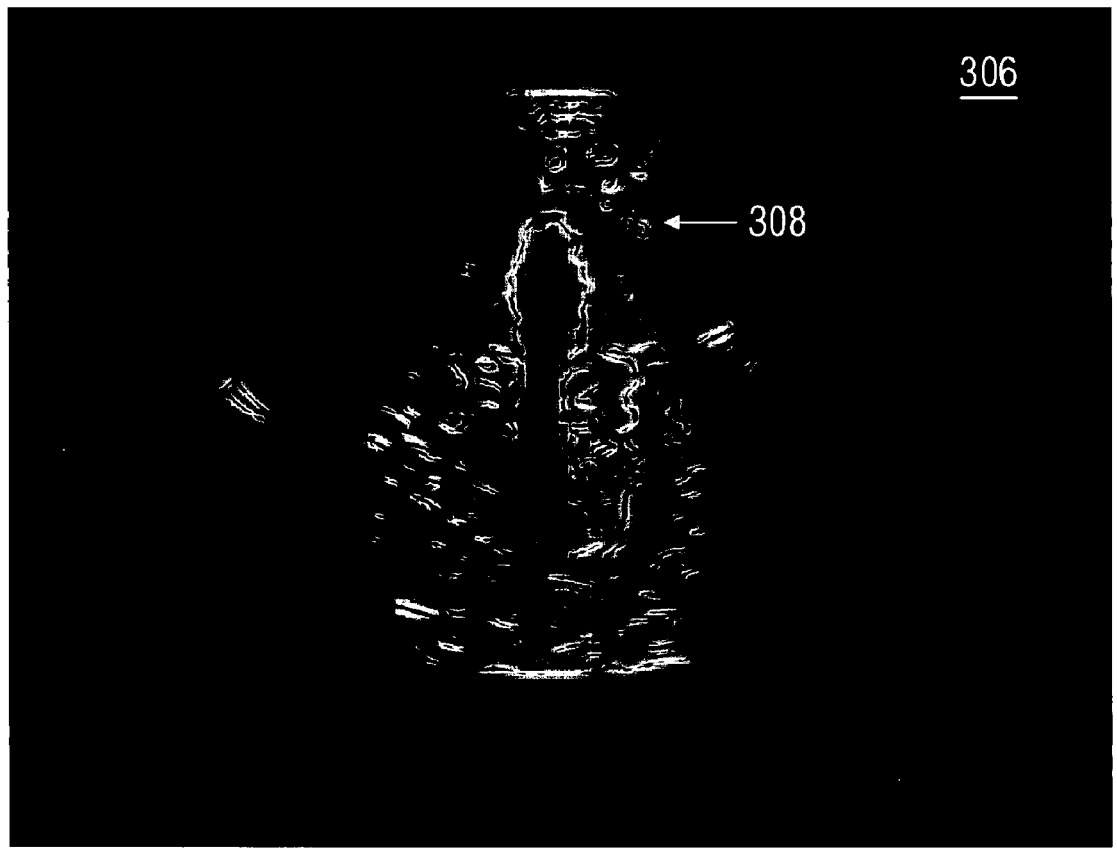
FIG. 3(c) illustrates a feature map of the cardiac ultrasound image of FIG. 3(a) generated using a conventional method.
Figure 4A:
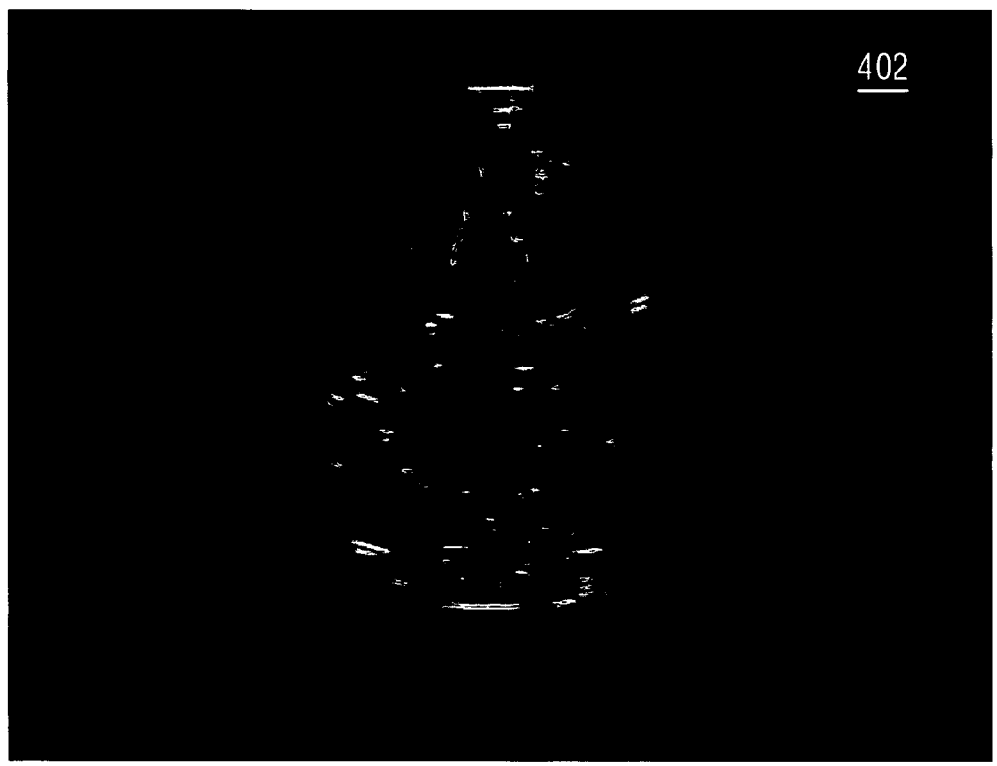
FIG. 4(a)-4(d) illustrate an effect of window size on exemplary results of an embodiment of the present invention.
Figure 4B:
Figure 4C:
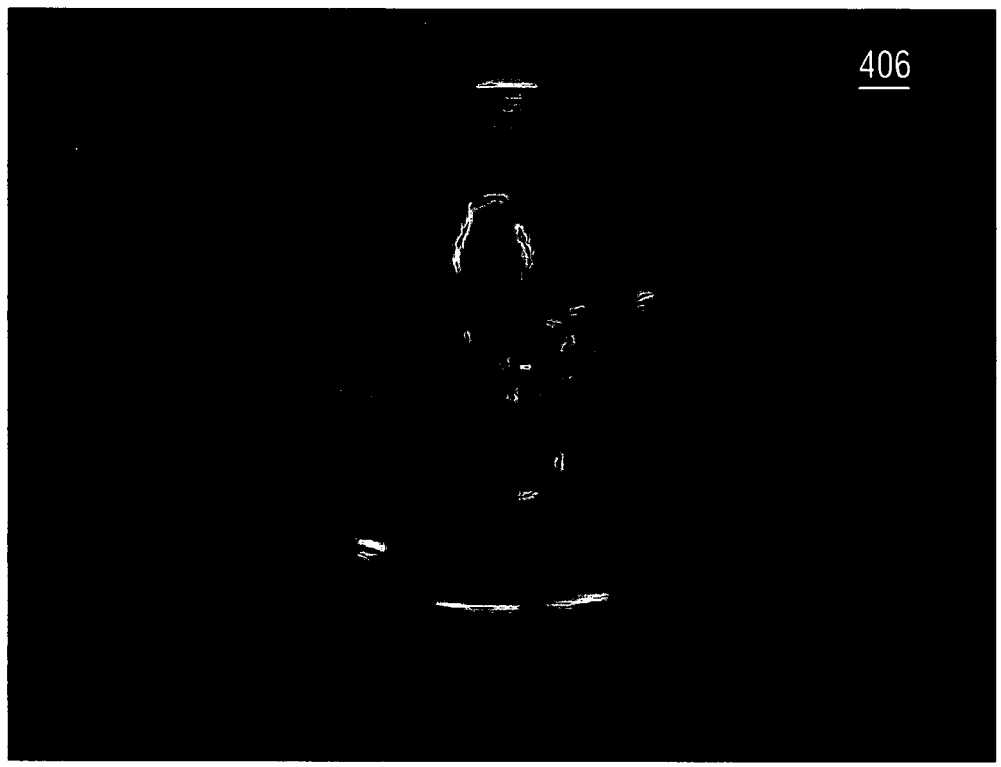
Figure 4D:
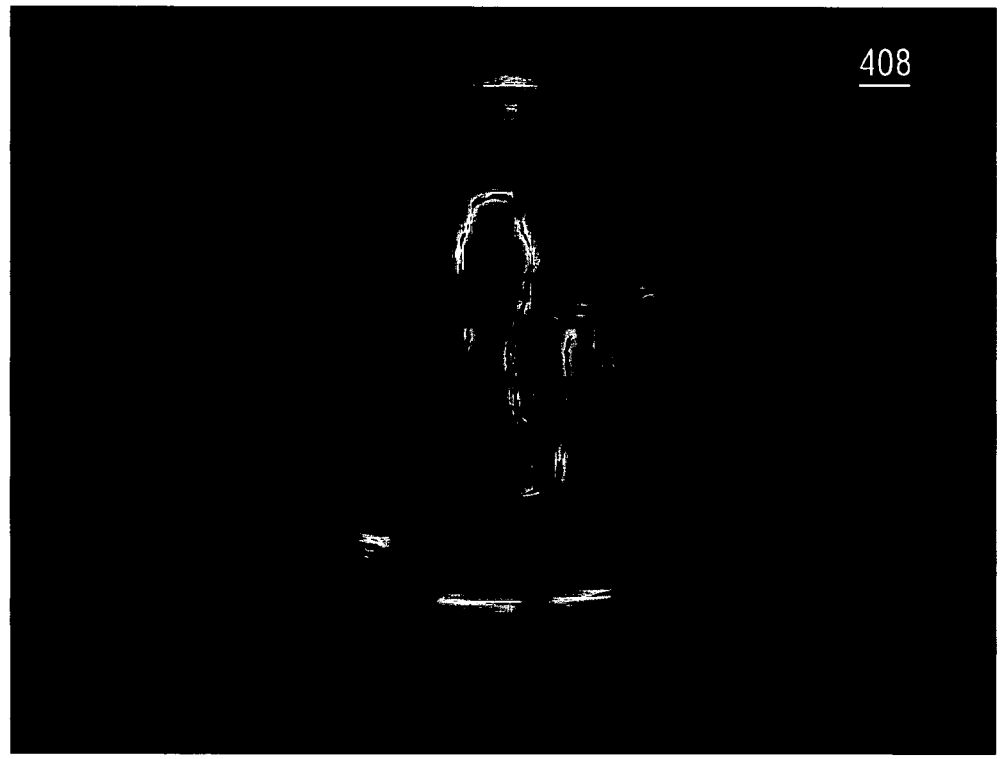

FIG. 3(b) illustrates a feature map 304 of the cardiac ultrasound image 302 of FIG. 3(a) according to an embodiment of the present invention. The feature map 304 was generated using FT distributions to estimate the speckle distributions according to an embodiment of the present invention. As illustrated in FIG. 3(b), the feature map 304 detects the most salient features of the cardiac ultrasound image 302. The feature map 304 of FIG. 3(b) can be compared with a conventional feature map 306 of FIG. 3(c), which was generated using a conventional gradient magnitude operator, as described above in the Background of the Invention section. As illustrated in FIG. 3(c), the conventional feature map 306 has significantly more speckle 308 than the feature map 304 generated according to an embodiment of the present invention.

Sensitivity of the feature detection method described above can be adjusted by varying the window size of the windows. For example, increasing the window size may give a better statistical modeling of a distribution's parameter in the window, and adjusts the scale of the features detected. FIGS. 4(a)-4(d) illustrate feature maps of the cardiac ultrasound image 302 of FIG. 3(a) generated according to an embodiment of the present invention using different window sizes. As illustrated in FIGS. 4(a)-4(d), feature maps 402, 404, 406, and 408 were generated using window sizes of 3×3, 5×5, 7×7, and 9×9, respectively. It can be observed from FIGS. 4(a)-4(d) that the size of features detected by the feature maps 402, 404, 406, and 408 is proportional to the window size.

Figure 5A:
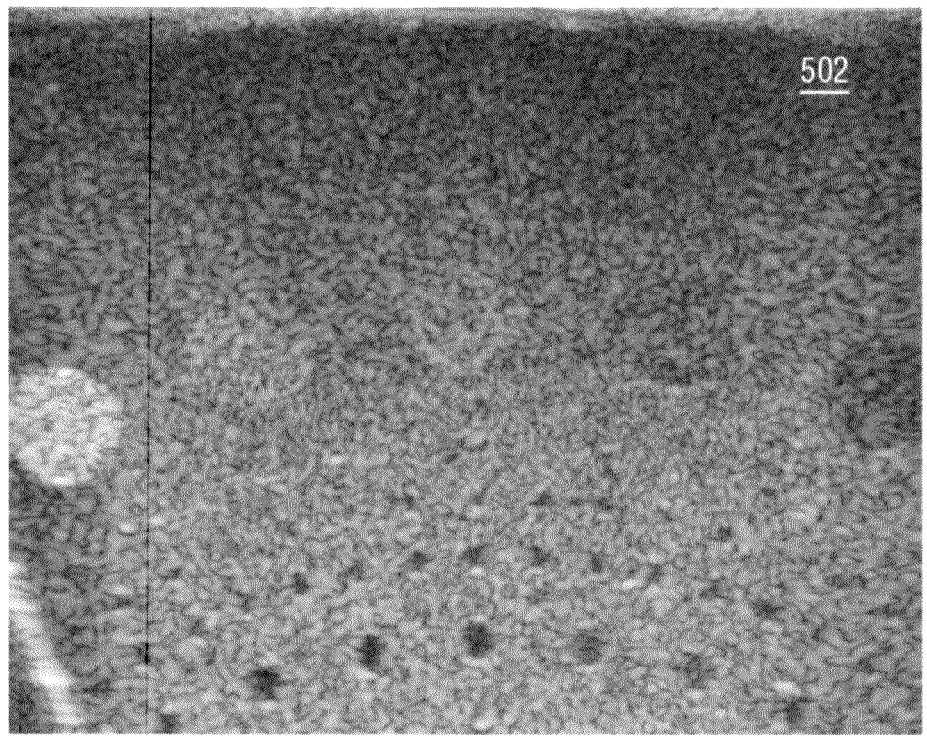
FIG. 5(a)-5(f) illustrate exemplary results of embodiments of the present invention compared with results of conventional methods.
Figure 5B:
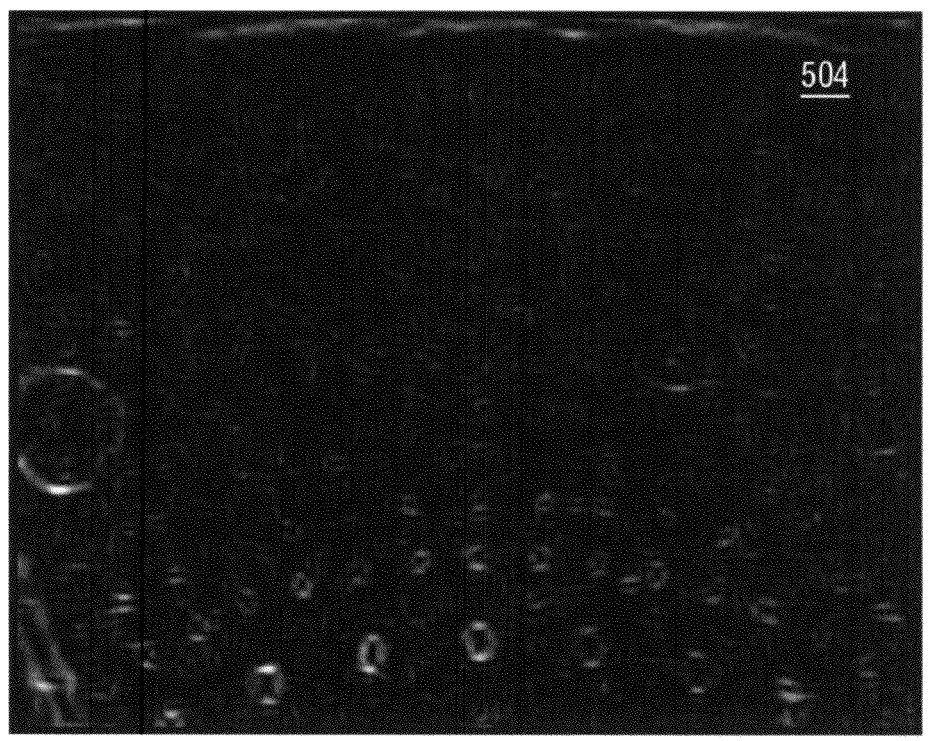
Figure 5C:
Figure 5D:
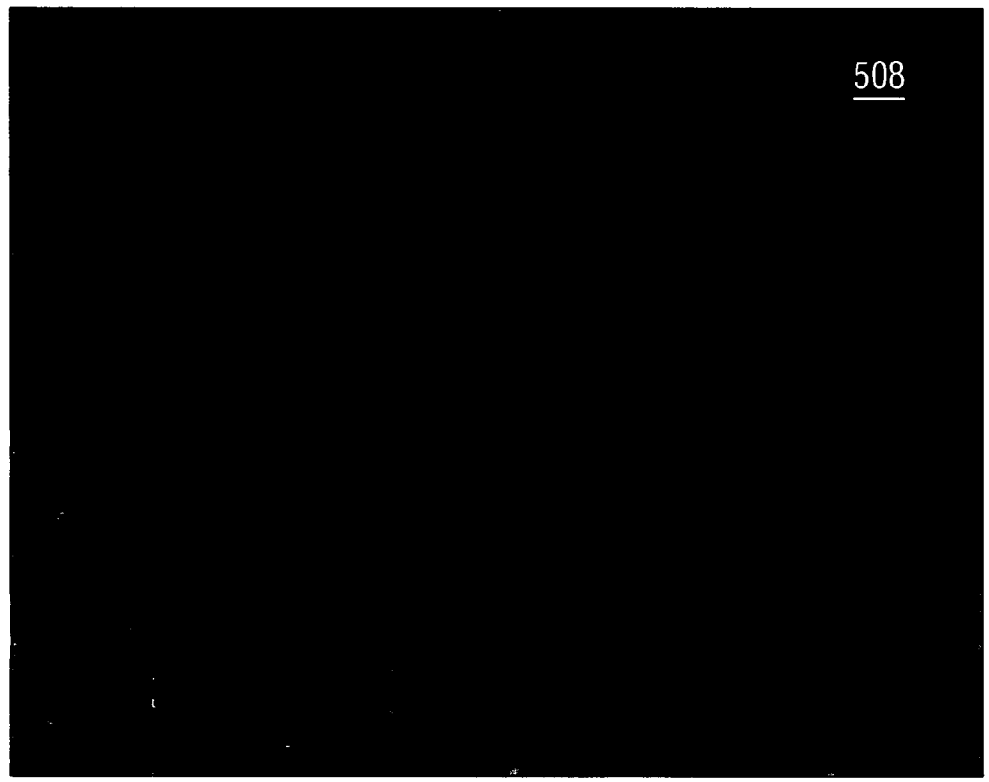
Figure 5E:
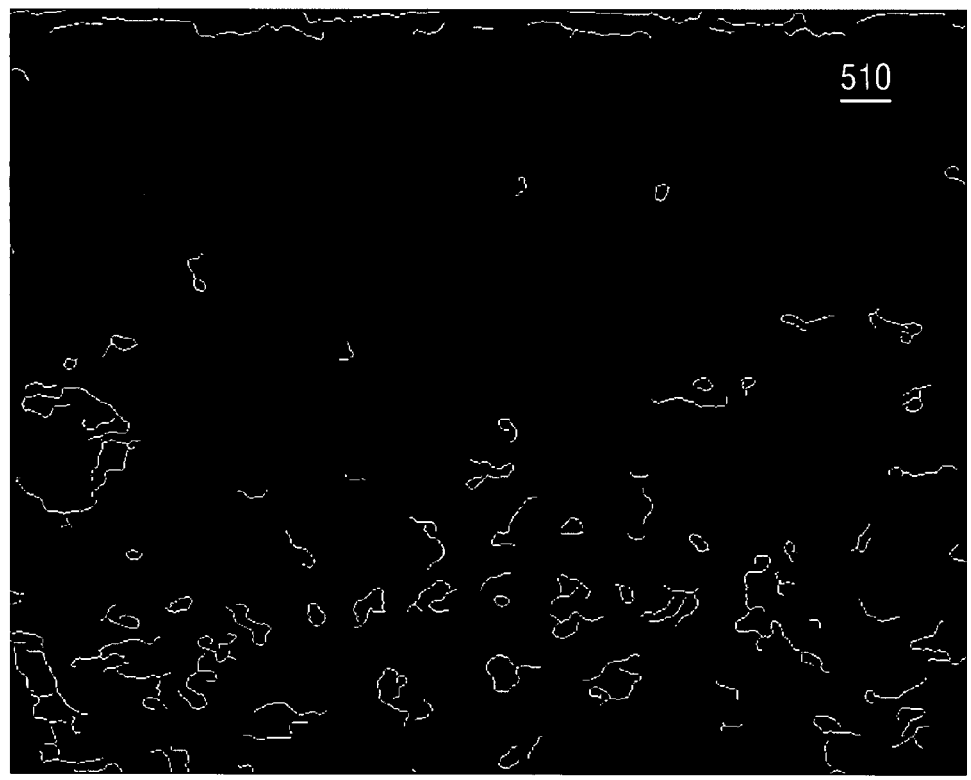
Figure 5F:

FIG. 5(a)-5(f) illustrate exemplary results of embodiments of the present invention compared with results of conventional methods. FIG. 5(a) illustrates a lesion phantom image 502. FIG. 5(b) illustrates a J-divergence feature map 504 applied to the magnitude IQ image of image 502 using the Rayleigh distribution according to an embodiment of the present invention. The feature map 504 of FIG. 5(b) was generated using a window size of 7×7. FIG. 5(c) illustrates a J-divergence feature map 506 applied to the Log Mag IQ image of image 502 using the FT distribution according to an embodiment of the present invention. The feature map 506 of FIG. 5(c) was generated using a window size of 7×7. FIG. 5(d) illustrates a conventional feature map 508 generated using the conventional derivative of Gaussian feature detector, which was performed using σ=5. As illustrated in FIG. 5(d), even with a large standard deviation, there is still a large amount of speckle prevalent. FIG. 5(e) illustrates a conventional feature map 510 generated using a Canny edge detector, which was optimized to detect the salient edges while minimizing false detection of speckle edges. FIG. 5(f) illustrates a feature detector 512 generated using the J-divergence non-parametrically, i.e., calculating $$J = \frac{D(p\|q) + D(q\|p)}{2}$$

Parzen-windowed histograms of the windows without estimating the speckle distributions in the windows. As illustrated in FIG. 5(f), the feature map 512 of FIG. 5(f) results in false detections due to speckle. Compared to other methods, the feature maps 504 and 506 generated using embodiments of the present invention have strong feature response while mitigating false responses due to speckle.

Figure 6:
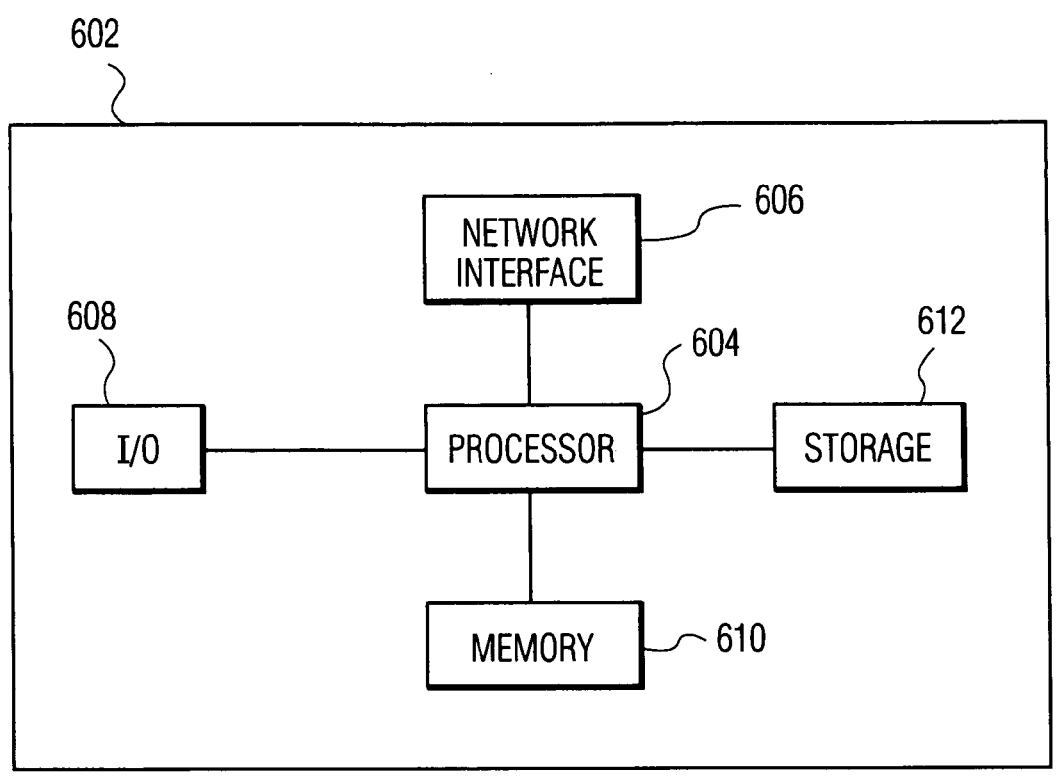
FIG. 6 a high level block diagram of a computer capable of implementing the present invention.

The above-described method for feature detection in ultrasound images can be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, applications for estimating the speckle distributions in regions of the image and calculating divergence between estimated speckle distributions can be defined by the computer program instructions stored in the memory 610 and/or storage 612 and controlled by the processor 604 executing the computer program instructions. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.) For example, a display can display the feature map generated using the above described method. One skilled in the art will recognize that an implementation of an actual computer could contain other components as well, and that FIG. 6 is a high level representation of some of the components of such a computer for illustrative purposes.

Embodiments of the present invention are described herein to give a visual understanding of the feature detection method. It is to be understood that these embodiments may be performed within a computer system using data stored within the computer system. Accordingly, some steps of the method can occur as internal representations within the computer system.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention

What is claimed is:

1. A method for feature detection in an ultrasound image by using a computer processor, the method comprising:
   (a) estimating speckle distribution in each of first and second windows adjacent to a pixel of said ultrasound image;
   (b) calculating for said pixel a first divergence value between the estimated speckle distribution in the first window and the estimated speckle distribution in the second window; and
   (c) generating a feature map for said ultrasound image by assigning said pixel an intensity value based on the first divergence value for said pixel.

2. The method of claim 1, wherein said first and second windows are on opposing sides of said pixel in a first direction.

3. The method of claim 2, further comprising:
   (d) estimating speckle distribution in each of third and fourth windows adjacent to said pixel on opposing sides of said pixel in a second direction; and
   (e) calculating a second divergence value for said pixel between the estimated speckle distribution in the third window and the estimated speckle distribution in the fourth window.

4. The method of claim 3, further comprising:
   (f) repeating steps (a)-(e) for each of a plurality of pixels in said ultrasound image.

5. The method of claim 4, further comprising:
   (g) generating a feature map of each of said plurality of pixels, wherein an intensity value for each pixel in the feature map is based on the first and second divergence values calculated for the pixel.

6. The method of claim 5, further comprising:
   (h) outputting said feature map to a display device to be displayed thereon.

7. The method of claim 3, wherein said first and second directions are orthogonal with respect to each other.

8. The method of claim 1, wherein said ultrasound image is a magnitude in-phase/quadrature image, and step (a) comprises:
   estimating a Rayleigh distribution in each of the first and second windows based on intensity values of pixels within each of the first and second windows, respectively.

9. The method of claim 1, wherein said ultrasound image is a logarithmic transform of a magnitude in-phase/quadrature image, and step (a) comprises:
   estimating a Fisher-Tippett distribution in each of the first and second windows based on intensity values of pixels within each of the first and second windows.

10. The method of claim 1, wherein step (b) comprises:
    calculating J-divergence between the estimated speckle distribution in the first window and the estimated speckle distribution in the second window based on Kullback-Liebler divergences calculated between the estimated speckle distributions in the first and second windows.

11. The method of claim 1, further comprising:
    (f) repeating steps (a)-(c) for each of a plurality of pixels of said ultrasound image.

12. A non-transitory computer readable medium encoded with computer executable instructions for performing a method for feature detection in an ultrasound image, the computer executable instructions defining steps comprising:
    (a) estimating speckle distribution in each of first and second windows adjacent to a pixel of said ultrasound image;
    (b) calculating for said pixel a first divergence value between the estimated speckle distribution in the first window and the estimated speckle distribution in the second window; and
    (c) generating a feature map for said ultrasound image by assigning said pixel an intensity value based on the first divergence value for said pixel.

13. The non-transitory computer readable medium of claim 12, wherein said first and second windows are on opposing sides of said pixel in a first direction.

14. The non-transitory computer readable medium of claim 13, wherein the computer executable instructions further define the steps of:
    (d) estimating speckle distribution in each of third and fourth windows adjacent to said pixel on opposing sides of said pixel in a second direction; and
    (e) calculating a second divergence value for said pixel between the estimated speckle distribution in the third window and the estimated speckle distribution in the fourth window.

15. The non-transitory computer readable medium of claim 14, wherein the computer executable instructions further define the step of:
    (f) repeating steps (a)-(e) for each of a plurality of pixels in said ultrasound image.

16. The non-transitory computer readable medium of claim 15, wherein the computer executable instructions further define the step of:
    (g) generating a feature map of each of said plurality of pixels, wherein an intensity value for each pixel in the feature map is based on the first and second divergence values calculated for the pixel.

17. The non-transitory computer readable medium of claim 12, wherein said ultrasound image is a magnitude in-phase/quadrature image, and the computer executable instructions defining step (a) comprise computer executable instructions defining the step of:
    estimating a Rayleigh distribution in each of the first and second windows based on intensity values of pixels within each of the first and second windows, respectively.

18. The non-transitory computer readable medium of claim 12, wherein said ultrasound image is a logarithmic transform of a magnitude in-phase/quadrature image, and the computer executable instructions defining step (a) comprise computer executable instructions defining the step of:
    estimating a Fisher-Tippett distribution in each of the first and second windows based on intensity values of pixels within each of the first and second windows.

19. The non-transitory computer readable medium of claim 12, wherein the computer executable instructions defining step (b) comprise computer executable instructions defining the step of:

calculating J-divergence between the estimated speckle distribution in the first window and the estimated speckle distribution in the second window based on Kullback-Liebler divergences calculated between the estimated speckle distributions in the first and second windows.

20. The non-transitory computer readable medium of claim 12, wherein the computer executable instructions further define the steps step of:

(d) repeating steps (a)-(c) for each of a plurality of pixels of said ultrasound image.

* * * * *